United States Patent [19]

Gupta

[11] Patent Number: 4,543,490
[45] Date of Patent: Sep. 24, 1985

[54] HIGH DENSITY DETECTOR ARRAY WITH REPLACEABLE SECTIONS

[75] Inventor: Nand K. Gupta, Libertyville, Ill.

[73] Assignee: Tokyo Shibaura Denki Kabushiki Kaisha, Japan

[21] Appl. No.: 523,366

[22] Filed: Aug. 15, 1983

[51] Int. Cl.⁴ .............................................. G01T 1/20
[52] U.S. Cl. ................................ 250/578; 250/366; 250/370
[58] Field of Search .............. 250/578, 209, 366–367, 250/370, 370 G; 357/30, 32; 378/146

[56] References Cited

U.S. PATENT DOCUMENTS 3,717,762  2/1973  Grenier et al. ................. 250/366
4,338,521  7/1982  Shaw et al. ..................... 250/366

Primary Examiner—Edward P. Westin
Attorney, Agent, or Firm—Finnegan, Henderson, Farabow, Garrett & Dunner

[57] ABSTRACT

A high density X-ray detector array comprising a large number of photocells produced on a single substrate with the array consisting of a large number of standard size photocells and selective repetitive placing of pairs of smaller width photocells between which the substrate may be interrupted to replace sections thereof should any of the photocells within those sections prove inoperative.

5 Claims, 3 Drawing Figures

HIGH DENSITY DETECTOR ARRAY WITH REPLACEABLE SECTIONS

BACKGROUND OF THE INVENTION

1. Field of the Invention

The present invention relates to a high density array of detectors for an X-ray scanning apparatus and the like.

2. Description of the Prior Art

Present computed tomography (CT) scanners and digital radiography systems used several hundred to several thousand X-ray detectors. Each X-ray detector includes a scintillator to convert X-rays into light and a photocell to convert that light into an electrical signal. In CT scanners as well as in digital radiography systems, it is important that the detectors have equal pitch, that the center-to-center distances from detector to detector are equal. It is also important that the detectors have maximum density. That is, the detectors need to be located as close as possible to one another thereby resulting in a detection system which has a high detection efficiency so that a patient need be exposed to only the minimum amount of X-ray to produce a satisfactory image.

Today, CT scanners and the like may conventionally employ either discrete X-ray detectors or array X-ray detectors.

In FIG. 1 there is illustrated a plurality of discrete X-ray detectors. Each such X-ray detector includes a photocell 10 which is mounted on an individual substrate 12. A scintillator 20 is provided for each photocell 10 to convert X-ray radiation into light to which photocells 10 are sensitive.

As is well known to those skilled in the art, each individual photocell 10 must be positioned at least a distance 14 from each edge 16, 18 of substrate 12 to permit sufficient cutting and kerf allowances to interrupt substrate 12 at each edge 16, 18 without damage to photocells 10. If photocells 10 were closer to edges 16, 18 of substrate 12 than distance 14, substrate 12 could not be diced, cut or otherwise interrupted to form edges 16 and 18 without damage to photocells 10.

Each photocell 10 is illustrated in FIG. 1 as being of equal width $W_1$. Each photocell 10 is separated from an adjacent photocell 10 by a distance $L_1$ equal to twice the distance 14. With the arrangement illustrated in FIG. 1, the center of each photocell 10 is separated from the center of another by a pitch $P_1$ equal to $W_1$ plus $L_1$.

Accordingly, when using discrete detectors as illustrated in FIG. 1, it is quite easy to achieve equal pitch for all detectors. However, when using a discrete detector scheme as illustrated in FIG. 1, a significant amount of space $L_1$ is required to be left between individual photocells 10. In addition, use of discrete detectors requires use of discrete scintillators 20 which are spaced apart from each other a finite distance. This leads to two problems. First, such an arrangement reduces the available signal and, hence, results in a poor signal-to-noise ratio. In addition, such an arrangement permits many X-rays to fall on dead areas between scintillators and, hence, such X-rays are not detected. This results in an increased required patient dose for a given amount of information gathered.

Separation $L_1$ between photocells can be reduced using an array detector arrangement as illustrated in FIG. 2. As was the case with the discrete detector scheme of FIG. 1, each photocell 22 is provided with a corresponding scintillator element 26. In FIG. 2, however, a large number of photocells 22 are located on a single substrate 24. Accordingly, photocells 22 may be positioned adjacent one another a distance $L_2$ apart, which distance $L_2$ is limited only by the masking and production techniques utilized to produce photocells 22. Accordingly, $L_2$ may be substantially smaller than $L_1$ of FIG. 1, thereby increasing available signal strength, reducing signal-to-noise ratio and also reducing the amount of dead area upon which X-rays may fall. In such an arrangement, moreover, there would be an equal pitch $W_2$, where $W_2$ equals $W_1$ plus $L_2$.

The density of photocells 22 may be maximized by making the entire array of thousands of detectors on a single substrate. However, if one of photocells 22 were to malfunction, the entire array would be worthless, since $L_2$ is too small to permit cutting, dicing or otherwise interrupting substrate 24 between adjacent photocells 22. Also, presently, it is not possible to fabricate an array larger than 4-5 inches in length because of the size limitation of available semiconductor wafers.

It would be possible to limit the number of photocells 22 on a single substrate, thereby minimizing the negative effects of having a single bad photocell within a group of detectors on a single substrate. However, each photocell 22a positioned adjacent an edge 28 of substrate 24 would need to be located a distance $L_1$ from that edge thereby resulting in a pitch $P_1$ between adjacent photocells 22a, in contrast to the standard pitch $P_2$ between adjacent photocells 22. Moreover, if equal width scintillator elements 26 are employed, a resulting gap G would be experienced between scintillator elements 24a which are associated with photocells 22a. This gap G introduces a new dead area and, hence, results in an increase in the required patient dosage for a given amount of information to be gathered.

It is, accordingly, an object of the present invention to provide a high density array which exhibits a uniform pitch between detectors and which permits selective removal of a limited group of detectors should any photocell of a detector within that group prove faulty.

Additional objects and advantages of the invention will be set forth in part in the description which follows, and in part will be obvious from the description or may be learned by practice of the invention.

SUMMARY OF THE INVENTION

To achieve the foregoing objects, and in accordance with the purposes of the invention as embodied and broadly described herein, a high density array of X-ray detectors is provided which comprises: (a) a plurality of groups of first photocells, these first photocells being mounted side-by-side on a substrate, these first photocells each being of equal width W and being spaced from one another by a separation distance L to maximize the density of the first photocells, the distance L being insufficient to permit interruption of said substrate between the first photocells without damage to the first photocells; and (b) a pair of side-by-side second photocells, with each second photocell having a width less than W, with a pair of second photocells located between two of the groups of first photocells, and with each of the second photocells being separated from an adjacent first photocell by the distance L, the centers of first photocells on opposite sides of the pair of second photocells being separated from each other by a distance equal to three times the sum of L plus W, and with the second photocells separated from each other by a distance sufficiently greater than L to permit selective interruption of the substrate between the second photocells without damage to the second photocells.

Preferably, the array of the subject invention further includes a plurality of equal width scintillators, each aligned with a respective one of the first and second photocells. It is also preferable that the pairs of second photocells be provided at regular intervals between groups of the first photocells.

As a consequence of the foregoing, two second photocells each having a width less than W are provided in a detection array, with one of the second photocells located at each end of a group of first detectors and with each second photocell separated from an adjacent first photocell by the distance L, the group of first photocells with a second photocell on each side of the group comprising a a unit. The center of each first photocell adjacent a second photocell is separated from a respective edge of the unit by a distance equal to one and one-half times the sum of L plus W and with the second photocells separated from the respective edges of the unit by a distance sufficiently greater than one half L to permit interruption of the substrate at the edges of the unit without damage to the second photocells.

DESCRIPTION OF THE PREFERRED EMBODIMENT

Reference will now be made in detail to the present preferred embodiment of the subject invention as illustrated in the accompanying drawings.

Figure 1:
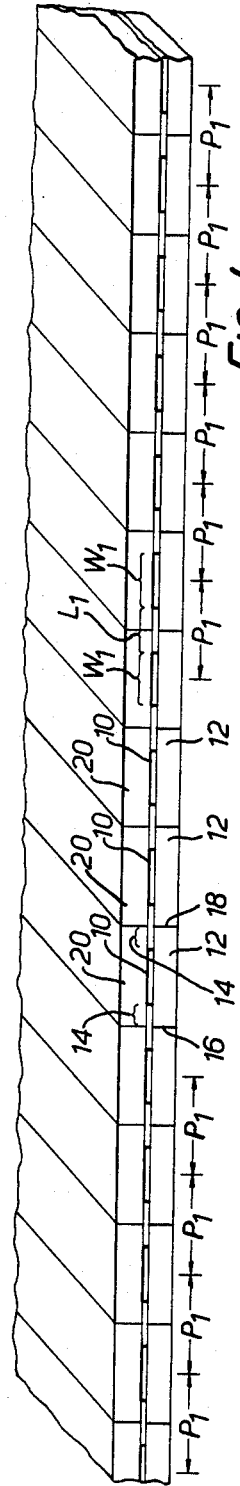
FIG. 1 illustrates a plurality of conventional discrete X-ray detectors.
Figure 2:
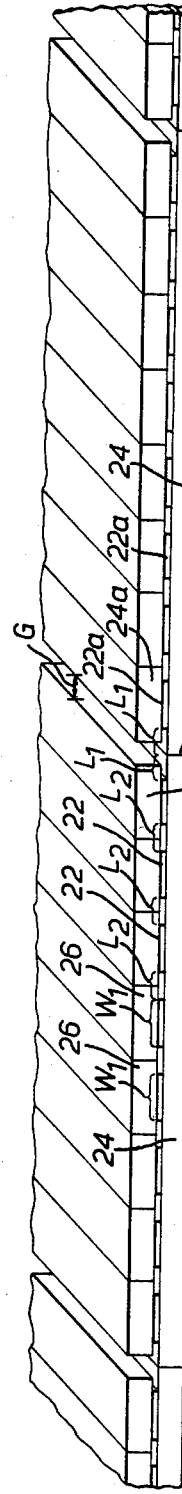
FIG. 2 illustrates a conventional array detector arrangement.
Figure 3:
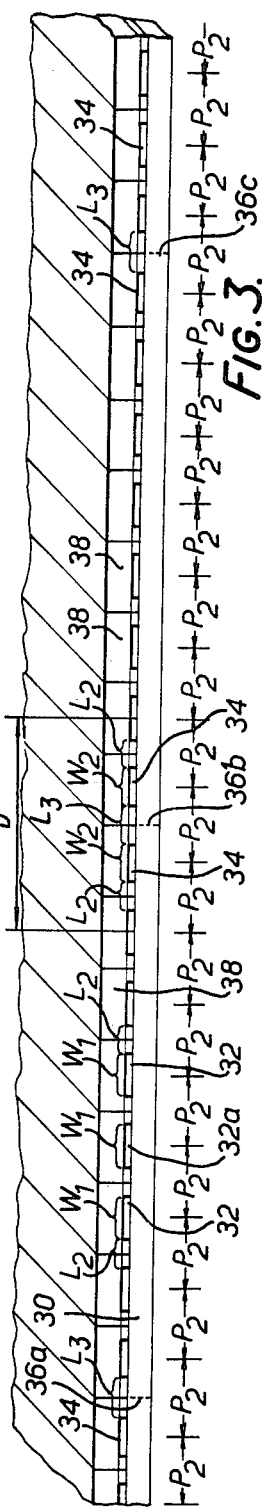
FIG. 3 illustrates a detector array incorporating the teachings of the present invention.

In FIG. 3 there is illustrated a single substrate 30 which has contained on it a plurality of photocells 32, each of which has a width $W_1$. Photocells 32 are located side-by-side on substrate 30 spaced apart from one another a separation distance $L_2$ which, as discussed above, maximizes the density of photocells 32. Distance $L_2$, however, is insufficient to permit interruption of substrate 30 between adjacent photocells 32 without damage to photocells 32.

Accordingly, there is provided a pair of side-by-side photocells 34, each of which has a width $W_2$ less than $W_1$, and referred to below as photocell 34 for ease of differentiation. Each pair of side-by-side photocells 34 is located between groups of photocells 32, with each photocell separated from the adjacent photocell by the distance $L_2$. However, the centers of photocells 32 on opposite sides of the pair of photocells 34 are separated by a distance D which is equal to three times the pitch of photocells 32, i.e., equal to three times the sum of $L_2$ plus $W_1$.

Photocells 34 are, in turn, separated from each other by a distance $L_3$ which is sufficiently greater than $L_2$ to permit selective interruption of substrate 30 between photocells 34 along dotted lines 36a–c without damage to photocells 32 or 34.

Accordingly, should a particular photocell 32 such as photocell 32a prove faulty, the entire group of photocells 32 associated with photocell 32a may be separated from the remaining portion of the array by interrupting substrate 30 at dotted lines 36a and 36b. The unit including photocell 32a may then be removed and replaced with an identical unit which has two photocells 34, each having a width $W_2$ less than width $W_1$, with one of photocells 34 located at each end of the photocells 32 within that group. Each photocell 34, as noted above, is separated from an adjacent photocell 32 by the minimum separation distance $L_2$, and the center of each detector 32, adjacent a photocell 34 is separated from a respective potential edge 36a–c of substrate 30 by a distance equal to one and one-half times the sum of $L_2$ plus $W_1$. Moreover, photocells 34 are each separated from a respective potential edge 36a–c by a distance one half $L_3$, which is sufficiently greater than one half $L_2$ to permit interruption of substrate 30 at dotted lines 36a–c without damage to photocells 34.

As is further illustrated in FIG. 3, a plurality of equal width scintillator elements 38 are each aligned with a respective one of photocells 32 and 34. Accordingly, there is no gap G between scintillator elements 38 and, therefore, no dead area where X-rays may fall and not be detected.

It is the scintillator which detects the X-rays and produces small amounts of light which is in turn detected by photocells 32 or 34. Since the scintillator array has an uniform pitch, the X-ray detection section has preserved a uniform pitch. Due to smaller size of photocells 34, a small amount of light is lost in the corresponding channels. This leads to a slight reduction in the signal amplitude in these few channels. This can be easily corrected by either slightly higher electronic gain in the corresponding amplifiers or through a software normalization. Since all X-rays are detected in the scintillator, hence, even in these few smaller photocells channels, dose efficiency is preserved, eliminating the need for any additional patient dose.

Accordingly, using the present invention, an array of a large number of photocells, including photocells, is provided on a single substrate. This photocell array consists of two different size photocells, referred to above for ease of description as photocells and photodetectors.

The dimension of most of the photocells in the array is consistent with best signal to noise ratio and best-dose utilization efficiency. Periodically, however, a pair of slightly smaller photocells is substituted in the array, leaving a larger space between these cells.

A typical 24-channel photocell array may comprise units of a plurality of eight—two small photocells and six regular size photocells. The space between photocells within the units is minimized. The space between units is large enough to permit dice cutting if a bad photocell is found in any unit. Using this scheme, if a bad photocell is found in a completed array, the unit containing the bad cell is diced, removed, and replaced with a different unit containing all operative photocells. This greatly improves the yield of photocells.

A scintillator array of equal size scintillators, consistent with best-dose utilization efficiency, is coupled to the above-mentioned photocell array. Since the scintillators detect the X-rays, there is a resultant detector array of equal pitch, with high detection efficiency, and low noise. In the relatively few reduced size photocells, the resultant signal is somewhat reduced and, hence, signal-to-noise ratio is somewhat worse only in those few photocells. However, there is detection of X-rays even in those reduced area photocells and, hence, dose efficiency has not been compromised.

Additional advantages and modifications will readily occur to those skilled in the art. The invention in its broader aspects is not, therefore, limited to the specific details and illustrative examples shown and described. Accordingly, departures may be made from such details without departing from the spirit or scope of applicant's general inventive concept.

I claim:

1. A high density X-ray detector array comprising:
   a. a plurality of groups of first photocells, said first photocells mounted side-by-side on a substrate, said first photocells being of equal width W and being spaced from one another by a separation distance L to maximize the density of said first photocells, said distance L being insufficient to permit interruption of said substrate between said first photocells without damage to said first photocells; and
   b. a pair of side-by-side second photocells with each of said second photocells having a width less than W, with said pair located between two of said groups of first photocells, with each of said second photocells separated from an adjacent first photocell by said distance L, the centers of said first photocells on opposite sides of said pair of second photocells being separated by a distance equal to three times the sum of L plus W, and with said second photocells separated from each other by a distance sufficiently greater than L to permit selective interruption of said substrate between said second photocells without damage to said second photocells.

2. The array of claim 1 further including a plurality of equal width scintillators, each aligned with a respective one of said first and second photocells.

3. The array of claim 1 wherein a pair of second photocells is provided at regular intervals between groups of said first photocells.

4. A high density X-ray detector array comprising:
   a. a plurality of units, each unit including a plurality of first photocells mounted side-by-side on a substrate, said first photocells being of equal width W and being spaced from one another by a distance L to maximize the density of said first photocells, said distance L being insufficient to interrupt said substrate between said first photocells without damage to said first photocells; and
   b. each unit further including two second photocells each having a width less than W, one of said second photocells located at each end of said plurality of first photocells, with each second photocell separated from an adjacent first photocell by said distance L, the center of each of said adjacent first photocells separated from a respective edge of said unit by a distance equal to one and one-half times the sum of L plus W, and with said second photocells each separated from said respective edges of said unit by a distance sufficiently greater than one-half L to permit interruption of said substrate at said edges of said units without damage to said second photocells.

5. The array of claim 4 further including a plurality of equal width scintillators each aligned with a respective one of said first and second photocells.

* * * * *